April 4, 1950
D. D. GRIEG
2,502,454
METHOD AND MEANS FOR IMPROVING SIGNAL TO NOISE RATIO OF SELECTED PULSE SIGNALS
Filed Dec. 27, 1944
2 Sheets-Sheet 2
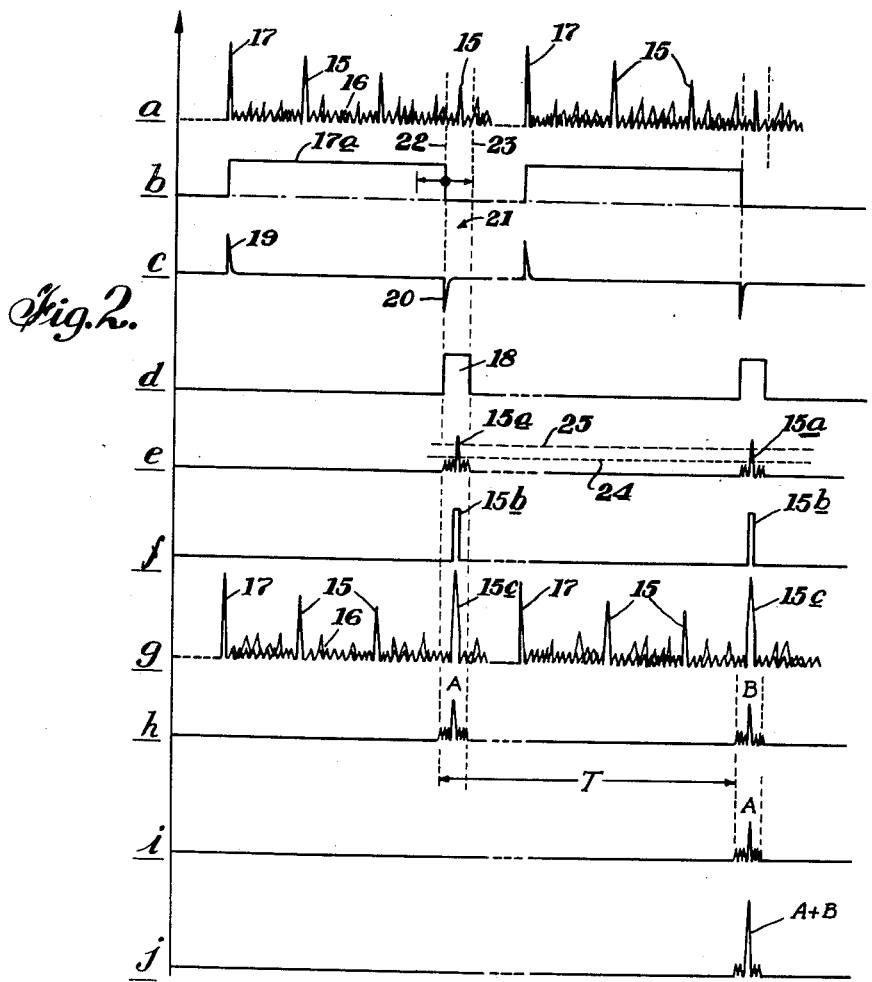
Fig. 2.
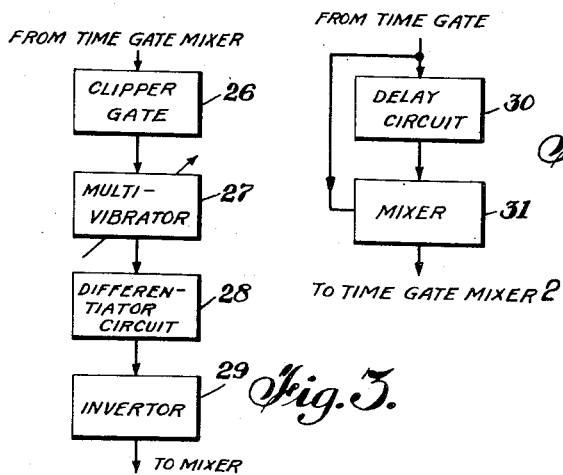
Fig. 3.
Fig. 4.
INVENTOR.
DONALD D. GRIEG
BY
ATTORNEY Patented Apr. 4, 1950

2,502,454

UNITED STATES PATENT OFFICE 2,502,454

METHOD AND MEANS FOR IMPROVING SIGNAL TO NOISE RATIO OF SELECTED PULSE SIGNALS

Donald D. Grieg, Forest Hills, N. Y., assignor to Federal Telephone and Radio Corporation, New York, N. Y., a corporation of Delaware Application December 27, 1944, Serial No. 569,975

10 Claims. (Cl. 343—13)

This invention relates to radio obstacle detection systems of the type wherein the timing of the pulses reflected from a given distant object in response to original transmitted pulses affords a measure of the distance of such an object. More particularly, the invention relates to a method and means for overcoming the effect of interference as by so-called background noise with the observation of the reflected pulses.

Systems of the aforementioned type operate according to the so-called pulse modulation principle wherein very brief trains of ultra-high frequency waves are intermittently radiated and the echoes of such radiation are examined at a receiving station to determine the distance of the reflecting object or objects. The reflected pulses occur at the receiving station at a point in time with respect to a given reference which is indicative of the distance covered by the pulses originally radiated and subsequently reflected by the object to be located. For a given original signal strength, the amplitude of the echo pulses at the receiver are, of course, inversely proportional to the distance travelled for objects having the same reflecting properties; so that the more distant objects or objects of small reflecting property will producle the weaker echo signals. Since a fairly high amplification is required to enable the receiver to observe the weaker echoes, the problem of background noise, that is the signal to noise ratio is of great consequence in this type of system.

Methods have been proposed in the past to overcome the effects of background noise, as for instance by processing the incoming pulses by level clipping or by width discrimination, where the desired signals are characterized by a given width.

However, under certain conditions, the use of the aforementioned or similar processing methods causes smaller echoes to be lost when larger or wider echoes are among those being investigated. For example, if a clipper unit is used and the clipping level set for the peak of a large echo to pass, thereby reducing interference and noise, echoes below the clipping level would also be rejected. As a result, the operator would not be certain that he was observing all echoes of importance. In accordance with the present invention the solution to this problem is provided by processing of a given signal or signal portion contained within a specified narrow time interval, so that signals appearing at times other than the specified interval remain in their normal condition on the viewing equipment. Those signals corresponding to the selected time interval may then be processed and examined by means of any one of a number of suitable methods.

It is, accordingly, an object of this invention to provide a method and means for facilitating the observation of a given portion of a train of pulses without altering the remainder of the train.

It is also an object to provide a method and means for improving the signal to noise ratio for a given echo or portion of echo pulses in a train of received pulses.

It is another object to provide a method and means for separating out a portion of a train of pulses occurring periodically with respect to time, processing the said portion and observing the processed portion together with the remainder of the pulse train.

In accordance with my invention I provide a radio location system comprised of apparatus for sending out a substantially repetitious pulse type signal which upon reflection by a given distant object or objects may be received in the form of a train of echo pulses which is synchronized by the sender.

A given portion of this train of pulses, including an echo pulse or pulses which it is desired to examine more closely, is then separated out of the pulse train by means of a time gate and processed to improve the signal to noise ratio thereof. After the processing step, the pulse train portion thus treated is reinserted into the pulse train in its proper place so that it may be viewed, for instance, by means of a cathode ray oscilloscope in conjunction with the remainder of the pulse train.

These and other features and objects of my invention will become more apparent from a reading of the following description in connection with the drawings included herewith, whereon:

Fig. 2 is a series of graphs illustrating the operation of a radio location system in accordance with the invention;

Fig. 3 is a block diagram of a portion of an alternative system; and

Fig. 4 is a block diagram of a variation of the processing circuit of my invention.

Figure 1:
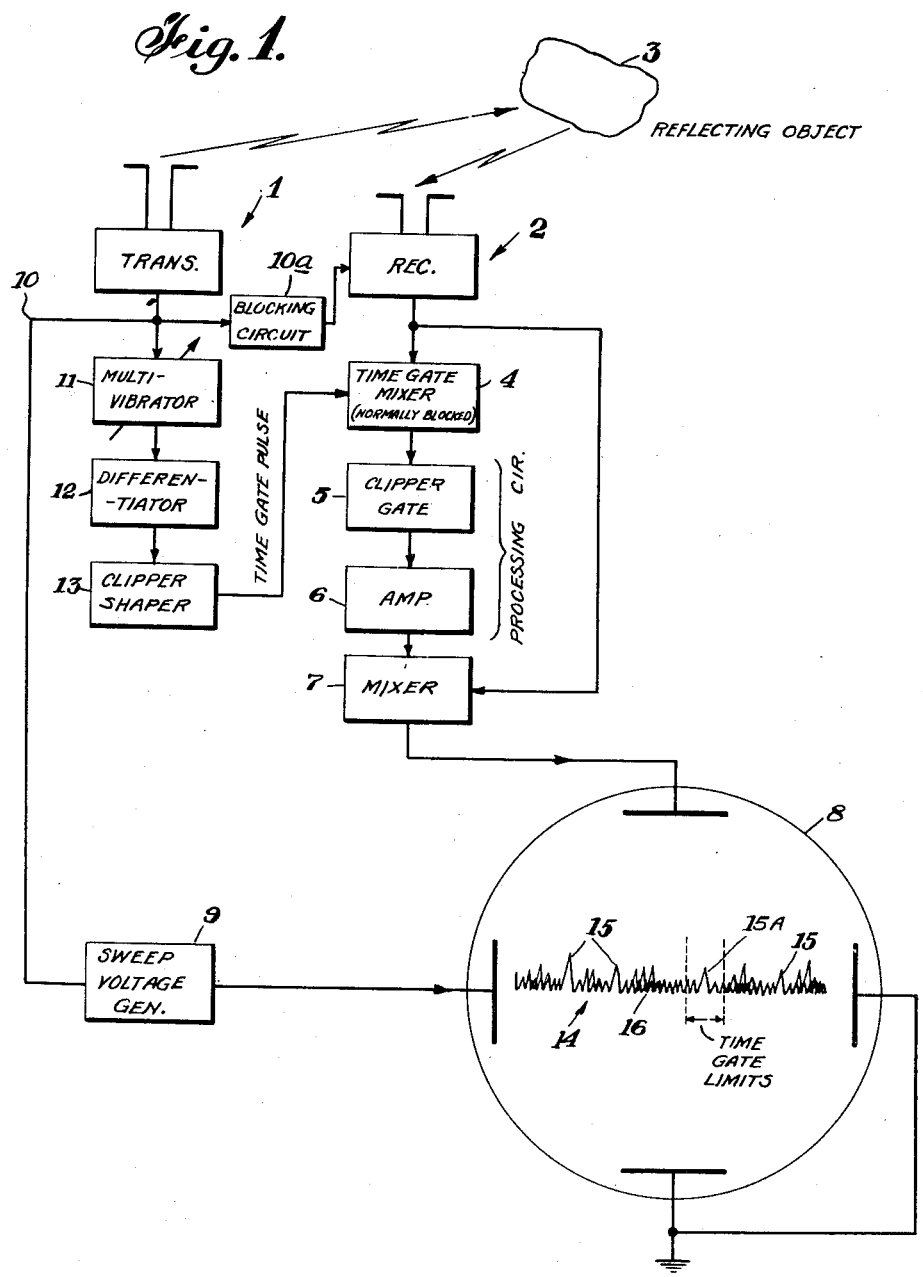
Fig. 1 is a block diagram illustrating a radio locating apparatus in accordance with the invention.

Referring to Fig. 1, there is shown a transmitter circuit 1 adapted to send out a periodical series of pulses and a receiver circuit 2 capable of receiving reflections or echoes of the transmitted pulses caused by distant objects such as the object 3. The receiver circuit includes a normally blocked time gate mixer 4 and, in the form shown in Fig. 1, a processing circuit comprised of a gate clipper 5 and an amplifier 6. The output of the processing circuit is mixed with the incoming pulse train in the mixer circuit 7. The combination pulse train as obtained from the mixer 7 including the processed portion may then be applied to the vertical deflection plates of a cathode ray oscilloscope 8 which receives a timing or sweep voltage from the sweep voltage generator 9. In order to be able to time the interval between a synchronizing impulse of the transmitter and the reception of the reflected echo pulses, synchronization or proper timing of the time sweep of the oscilloscope is required and may be obtained from the transmitter circuit over a connection 10. This synchronizing impulse may also be used to actuate a multivibrator circuit 11 the output of which is differentiated in a circuit 12 and subsequently subjected to a clipping and shaping operation in a circuit 13, whereby a synchronized deblocking impulse is obtained for the operation of the time gate circuit 4 as will appear presently.

In graph $a$, in Fig. 2, and at 14 in Fig. 1 there is shown a representative form of pulse train such as may be observable on the screen of the oscilloscope 8. This pulse train (graph $a$) usually comprises a plurality of echo pulses 15 which are intermingled with random noise pulses 16. Pulse 17 is representative of the pulse transmission of transmitter 1 and while shown in graph $a$, is preferably blanked out at the receiver by a blocking pulse from blocking circuit 10a. The pulse train is applied to both the time gate mixer 4 and mixer 7. The mixer 4 being normally blocked and controlled by a deblocking or time gate pulse of the type shown at 18 in graph $d$ as received from the clipper shaper circuit 13. The time gate pulse 18 may be generated as indicated in Fig. 1 by applying a synchronizing pulse such as shown at 17 in graph $a$ to the multivibrator 11 whereby a square shaped pulse 17a of the type shown in graph $b$ is generated, the width of which may be regulated by an adjustment of the time constants of the multivibrator. By differentiating the pulse 17a of graph $b$, two equal and opposite pulses due to the leading and trailing edges thereof are obtained as at 19 and 20 in graph $c$. Pulse 20, by being clipped and properly shaped and amplified may then be made to result in the pulse 18, graph $d$, of a width sufficient to cover the time gate interval 21 as indicated by the two broken lines 22 and 23 in graph $a$.

By applying the time gate pulse 18 thus obtained from the circuit 13 to the time gate mixer 4 a limited portion of the pulse train such as indicated in graph $e$ will be passed by the circuit 4. This limited portion may be so selected as to include a particular echo pulse indication 15a which the operator desires to observe. By clipping the selected portion between limits 24 and 25 at clipper gate 5 and amplifying the clipped portion either at 5 or 6 or at both stages, a substantially rectangular pulse 15b is obtained with a substantial amount of interference on this pulse removed. On being mixed with the original pulse train in the mixer 7 a pulse train is obtained as indicated in graph $g$. The operator may now, more easily observe pulse 15a in its processed form 15c and at the same time observe other pulse phenomena occurring in the received train of pulses. Improvement in the signal to noise ratio of any given portion of the original pulse train and the examination of such processed portion side by side with the remainder of the pulse train is thus made possible by my invention.

Other forms of processing circuits are represented in Figs. 3 and 4. After having isolated or separated, a given portion of the pulse train by means of the time gate pulse, as explained hereinabove this isolated portion is clipped in a gate clipper circuit 26 whereby a part of a given pulse in said portion is obtained for actuation of the multivibrator circuit 27. The width of the pulse thus obtained from the multivibrator circuit may be determined by adjustment of the time constants thereof in a well-known manner. This pulse width is made to correspond to the time lapse between transmission of a given signal and a selected echo pulse received in response to such signal. By differentiating in a circuit 28 and inverting the resulting negative pulse due to the trailing edge in the inverter circuit 29 a pulse is obtained which coincides in time with the echo pulse selected for distance determination. By mixing this delayed pulse with the original pulse train, an amplification in effect of the selected echo pulse is obtained and the observation thereof is thereby facilitated.

In Fig. 4 another form of processing circuit is indicated. The amplification of the selected echo pulse or pulse train portion in this case may be had by means of a delay circuit 30 which is made to delay the selected echo pulse by a time interval corresponding to a complete cycle, that is, to the rate of repetition of the echo pulse. The effect of this is graphically shown in graph $h$ of Fig. 2 where, by means of the time gate an echo pulse or a portion A of the original pulse train has been isolated, such group occurring again at B after an interval T. The delay circuit 30 is effective in delaying the portion A by the time interval T so that portions B and A coincide in time as in graph $i$. The mixing of the delayed portion A in a mixing circuit 31 with the original pulse train results in an amplification or magnification of the selected portion as indicated in graph $j$. Since the noise occurs in random fashion no such coincidence on the average will take place for the noise pulses. Thus, a real improvement in signal-noise ratio results.

If desired, the delay feature of Fig. 4 may be repeated by adding to the output of mixer 31 another delay circuit and mixer, the output of the second delay circuit being mixed with the same pulse train input as applied to circuit 30. It will also be clear that if desired a clipper gate similar to clipper gate 5 may be inserted in the input connection to circuit 30 to select a part only of the echo pulse of interest to the operator.

In normal operation of the device as described, the oscilloscope of Fig. 1 will be the only portion of the equipment that need be observed, inasmuch as it provides a view of the entire range of the apparatus. When it is desired to examine a particular reflecting object by its echo pulse, the operator would so adjust the multivibrator circuit 11 as to produce a suitable time gate pulse having a sufficient width and proper location in respect to time so as to enable the isolation of the desired echo pulse. In most cases this adjustment will be sufficient. Other adjustments may be necessary in the respective processing circuits in order to obtain the required signal-noise improvement. The observation of the magnified form of the selected echo pulse in a comparative setting with the remainder of the pulses may then proceed in the normal manner as is customary with radio location apparatus, that is the determination of distances by a suitable calibration. Similarly, the azimuth and elevation of the object, and the speed of approach or retrogression of the object with respect to the observer may be carried on in the usual manner.

In the above I have described a relatively simple arrangement for making possible the investigation with a high degree of accuracy of any portion of the pulse train indicated by the apparatus, the only limitation being the range of the radio location system itself.

While the invention has been described in particular connection with forms illustrating especially the processing circuits shown in the drawings, it is to be understood that many modifications, additions, and omissions may be made within the scope as defined in the appended claims.

I claim:

1. A radio location system comprising means for receiving a train of pulses, means for examining said pulse train, means for isolating in respect to time a given portion of said pulse train, means for processing said given portion for improving the signal to noise ratio thereof, and means for mixing said processed portion with said original pulse train, whereby the examination of said given portion with respect to the other pulses of said train is facilitated.

2. A system in accordance with claim 1, wherein said means for isolating includes a time gate circuit.

3. A system in accordance with claim 1, wherein said means for processing comprises a gate clipper and an amplifier circuit.

4. A system in accordance with claim 1, wherein at least parts of said train are repeated at regular intervals and said means for processing includes a circuit for delaying said portion an amount at least equal to one of said intervals.

5. A system in accordance with claim 1, wherein said means for processing includes means for amplifying said portion.

6. A radio location system comprising a transmitter for transmitting signal pulses, a time gate pulse producing means synchronized to the transmission of said signal pulses, means for receiving reflected pulses from distant objects in response to said signal pulses, a normally blocked mixer circuit adapted to be unblocked by said time gate pulse to pass a portion of the pulses received in response to each transmitted signal, means for processing said portion of pulses to facilitate examination of at least one pulse thereof, means for mixing said processed portion with the received reflection pulses, an oscilloscope connected for viewing the received pulses and said processed portion, and a sweep voltage generator for said oscilloscope synchronized to the transmission of said signal pulses.

7. A radio location system according to claim 6, wherein the time gate pulse producing means includes means for adjusting the timing of the time gate pulse produced thereby with respect to said signal pulses.

8. The method of facilitating the observation of a desired corresponding portion of successively occurring trains of periodic pulses, comprising selecting in respect to time a desired corresponding portion of the said pulse trains, processing said selected desired portion to emphasize at least one of its characteristics, re-inserting said processed portion in one of said trains of pulses in a time position corresponding to its original position whereby said desired portion is effectively emphasized with respect to the other portions of the original pulse train.

9. The method in accordance with claim 8 wherein the step of processing comprises clipping pulses of said selected portion above a given voltage level and amplifying the resulting clipped pulses.

10. The method in accordance with claim 8 wherein the step of processing comprises delaying said selected desired portion by an amount in time equal to the periodicity of said portion.

DONALD D. GRIEG.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 2,227,057 | Blumlein | Dec. 31, 1940 |
| 2,310,692 | Hansell | Feb. 9, 1943 |
| 2,361,437 | Trevor | Oct. 31, 1944 |
| 2,401,416 | Eaton | June 4, 1946 |
| 2,403,527 | Hershberger | July 9, 1946 |
| 2,406,316 | Blumlein et al. | Aug. 27, 1946 |
| 2,410,233 | Percival | Oct. 29, 1946 |
| 2,412,995 | Levy | Dec. 24, 1946 |
| 2,416,088 | Deerhake | Feb. 18, 1947 |
| 2,419,620 | Young | Apr. 29, 1947 |

FOREIGN PATENTS

| Number | Country | Date |
| --- | --- | --- |
| 491,728 | Great Britain | Sept. 8, 1938 |
| 552,072 | Great Britain | Mar. 22, 1943 |